United States Patent
Chen et al.

(10) Patent No.: US 9,937,570 B2
(45) Date of Patent: Apr. 10, 2018

(54) CUTTING MACHINE, ESPECIALLY A CIRCULAR SAW

(71) Applicant: CHERVON (HK) LIMITED, Wanchai (HK)

(72) Inventors: Shibo Chen, Nanjing (CN); Xiangqing Fu, Nanjing (CN); Hongwei Wang, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 58 days.

(21) Appl. No.: 15/190,872

(22) Filed: Jun. 23, 2016

(65) Prior Publication Data

US 2017/0001251 A1    Jan. 5, 2017

(30) Foreign Application Priority Data

Jun. 30, 2015    (CN) .......................... 2015 1 0388386

(51) Int. Cl.
*B27B 9/00*    (2006.01)
*B23D 47/12*    (2006.01)
*H02K 7/14*    (2006.01)

(52) U.S. Cl.
CPC ............... *B23D 47/12* (2013.01); *B27B 9/00* (2013.01); *H02K 7/14* (2013.01); *H02K 7/145* (2013.01)

(58) Field of Classification Search
CPC .. B27B 9/02; B27B 9/00; B23D 47/12; H02K 7/14; H02K 7/145
USPC ..................................................... 30/374, 388
See application file for complete search history.

(56) References Cited

U.S. PATENT DOCUMENTS

| 2013/0333228 | A1* | 12/2013 | Ota ........................ | B23D 47/12 30/273 |
| 2016/0046448 | A1* | 2/2016 | Lautenschlager ........ | H02K 5/10 198/617 |
| 2016/0067887 | A1* | 3/2016 | Johnsen ................. | B23D 47/12 125/14 |
| 2016/0226339 | A1* | 8/2016 | Niwa ...................... | H02K 7/145 |
| 2017/0271945 | A1* | 9/2017 | Germann ............... | H02K 7/085 |

* cited by examiner

*Primary Examiner* — Omar Flores Sanchez
(74) *Attorney, Agent, or Firm* — Greenberg Traurig, LLP

(57) ABSTRACT

A cutting machine includes a cutting element for cutting material, a motor for driving the cutting element to rotate and a housing for containing the motor. The motor includes a rotor sleeve being formed with a receiving chamber, a motor shaft being capable of rotating together with the rotor sleeve, a stator core at least partially contained in the receiving chamber, stator coils wound around the stator core, and a stator bracket for fixing the stator core. The stator core is formed with a through hole for the motor shaft to pass there through, the stator coils are located outside the through hole and, the motor shaft is capable of rotating relative to the stator core.

10 Claims, 3 Drawing Sheets

CUTTING MACHINE, ESPECIALLY A CIRCULAR SAW

RELATED APPLICATION INFORMATION

This application claims the benefit under 35 U.S.C. § 119(a) of Chinese Patent Application No. CN 201510388386.2, filed on Jun. 30, 2015, the disclosure of which is incorporated herein by reference in its entirety.

FIELD OF THE DISCLOSURE

The present disclosure relates generally to cutting machines and, more particularly, to a circular saw.

BACKGROUND OF THE DISCLOSURE

Circular saws are widely used in various applications, for example, to cut wood and stone material. Generally, the circular saw includes a power unit, a motor, a transmission system and a saw blade.

For currently known circular saws, when the rotation speed is high, the output torque may be decreased so the cutting ability is decreased. However, to increase the output torque by decreasing the rotation speed may result in reducing the speed of the circular saw.

The statements in this section merely provide background information related to the present disclosure and may not constitute prior art.

SUMMARY

In one aspect of the disclosure, a cutting machine includes a cutting element for cutting material, a motor for driving the cutting element to rotate, and a housing for containing the motor. The motor includes a rotor sleeve formed with a receiving chamber, a motor shaft capable of rotating together with the rotor sleeve, a stator core at least partially contained in the receiving chamber, stator coils wound around the stator core, and a stator bracket for fixing the stator core. The stator core is formed with a through hole for the motor shaft to pass there through, the stator coils are located outside the through hole and, the motor shaft is capable of rotating relative to the stator core.

In another aspect of the disclosure, a circular saw includes a saw blade for cutting material, a motor for driving the saw blade to rotate, and a housing for containing the motor. The motor includes a rotor sleeve formed with a receiving chamber, a motor shaft capable of rotating together with the rotor sleeve, a stator core at least partially contained in the receiving chamber, stator coils wound around the stator core, and a stator bracket for fixing the stator core. The stator core is formed with a through hole for the motor shaft to pass there through, the stator coils are located outside the through hole and, the motor shaft is capable of rotating relative to the stator core.

Further areas of applicability will become apparent from the description provided herein. It should be understood that the description and specific examples are intended for purposes of illustration only and are not intended to limit the scope of the present disclosure.

Figure 1:
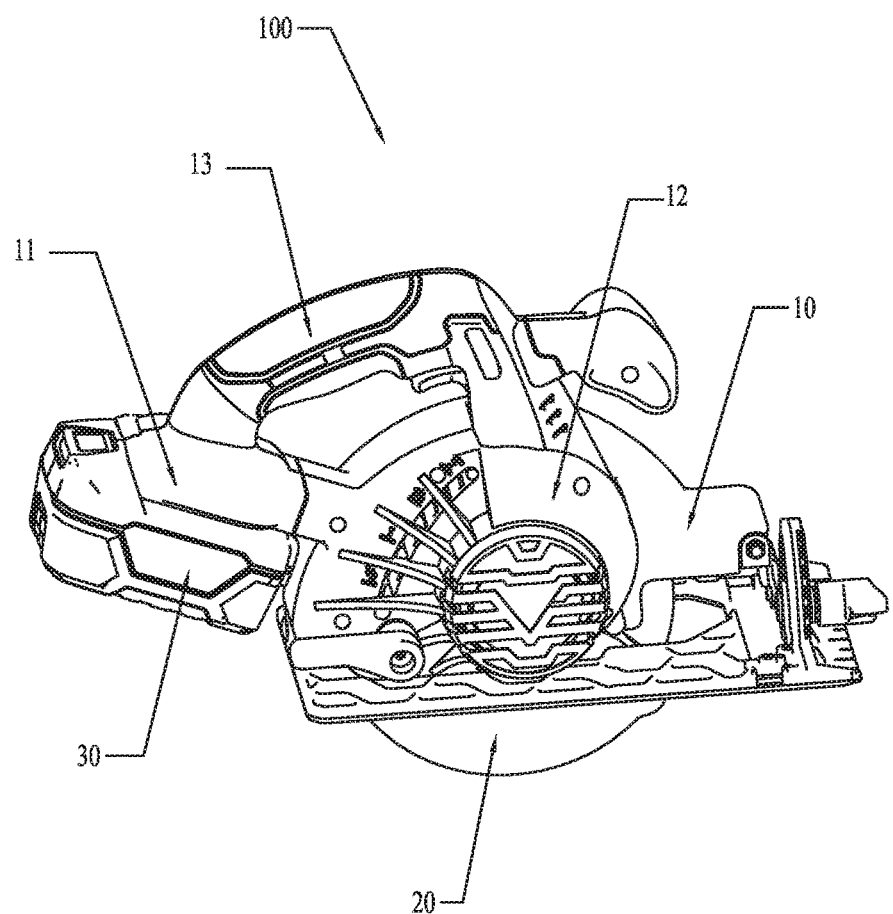
FIG. 1 is a schematic view of an exemplary circular saw.
Figure 2:
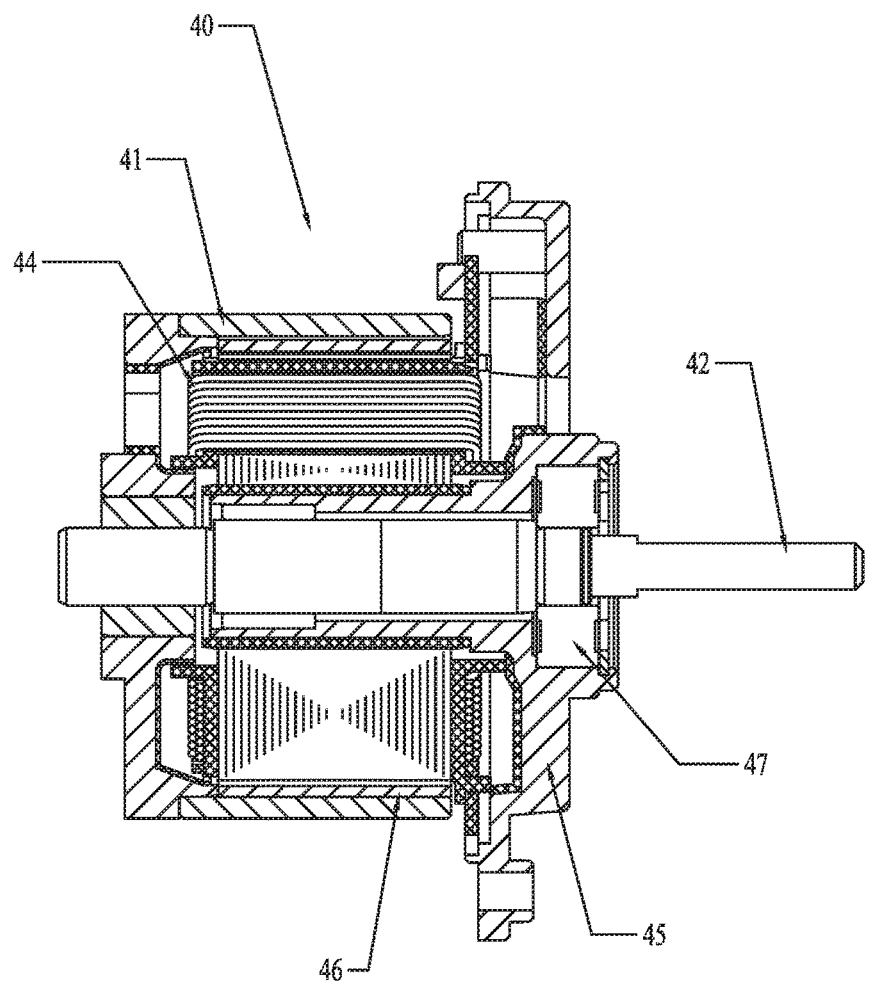
FIG. 2 is a sectional view of a motor of the circular saw in FIG. 1.
Figure 3:
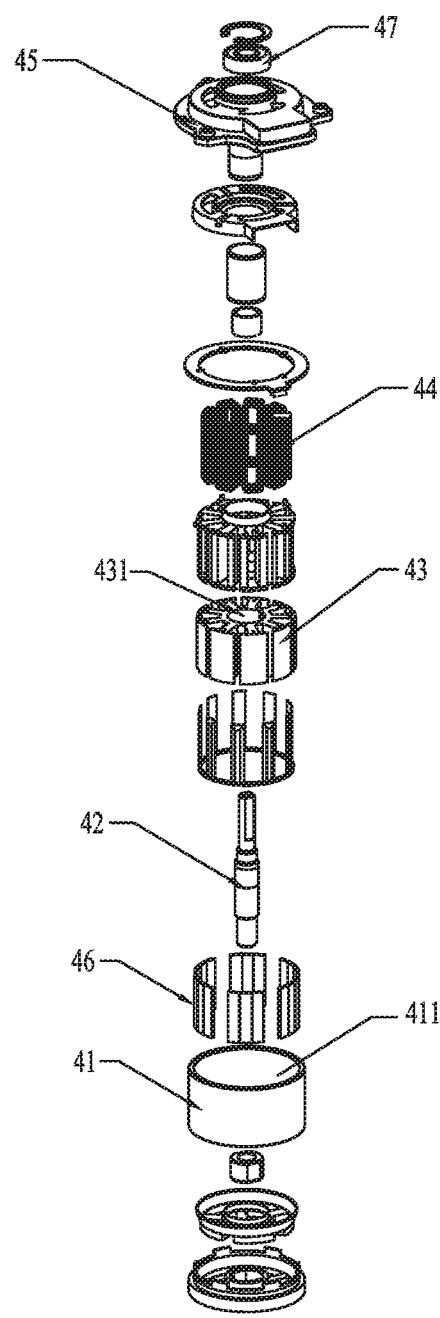
FIG. 3 is an exploded view of the motor of the circular saw in FIG. 1.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention hereinafter claimed, its application, or uses.

As shown in FIG. 1, a circular saw 100, as an example of a cutting machine, includes a housing 10, a cutting element 20, a power unit 30 and a motor 40. The circular saw 100 further includes a transmission system accommodated in the housing 10 for transmitting power between the cutting element 20 and the motor 40. With the transmission system, the motor 40 is capable of driving the cutting element 20 to rotate at a certain transmission ratio.

The housing 10 is adapted to form the shape of the circular saw 100, which includes a connection portion 11, a containing portion 12 and a handle portion 13. The connection portion 11 is used to detachably connect the power unit 30 with the housing 10, so that the housing 10 and the power unit 30 form a whole that can move together, which facilitates the carrying of the circular saw 100. The containing portion 12 is used to contain the motor 40. The handle portion 13 is provided with a handle that can be gripped by a user.

The cutting element 20 is used to cut material, which is mounted on an output shaft of the cutting element 20. The cutting element 20 may be a saw blade applicable for the circular saw 100. Specifically, the cutting element 20 may be a circular saw blade.

When the cutting element 20 is rotated, a rim thereof, which is furthest from a rotation axis of the cutting element 20, forms a circular track. A radius of the circular track is defined as a rotation radius of the cutting element 20.

When the cutting element 20 is the circular saw blade, and the rotation axis goes through the center of the circular saw blade, the rotation radius of the saw blade is equal to a radius of circular saw blade.

Regardless of the shape of the cutting element 20, when it is rotated, the rotation radius thereof decides the force generated by the resistance. So the rotation radius may affect the cutting efficiency of the circular saw 100.

The power unit 30 is used to provide energy to the circular saw 100, which is constructed as a detachable battery pack. The battery pack includes a number of cells for storing electric energy. In one embodiment, the rated voltage of the battery pack is 18V. The battery pack includes five cells; the rated voltage of each cell is 3.6V. Alternatively, the circular saw 100 can be connected with an AC power source.

The motor 40 is accommodated in the housing 10, which is capable of converting the electric energy provided by the power unit 30 into mechanical energy.

Specifically, the motor 40 is an outer rotor, brushless motor, which can be driven by a driving circuit. The motor 40 includes a rotor sleeve 41, a motor shaft 42, a stator core 43, stator coils 44, and a stator bracket 45.

The rotor sleeve 41 includes an inner wall which defines a receiving chamber 411 at least for receiving the stator core 43.

The motor 40 includes a number of magnetic elements 46 which are disposed on the inner wall of the rotor sleeve 41. The magnetic elements 46 can produce a magnetic field in the rotor sleeve 41.

The motor shaft 42 is used to output the power generated by the motor 40. The motor shaft 42 is fixedly connected with the rotor sleeve 41, so that they can rotate together.

The stator core 43 is made from metal material, which is formed with several winding structure for receiving stator coils 44. The stator core 43 includes a through hole 431 for the motor shaft 42 to pass there through. The stator coils 44 are located on the outside of the through hole 431.

The stator coils 44 are wound around the stator core 43 so as to constitute the windings of the motor 40. The windings are driven by a driver and the driving circuit of the circular saw 100 so as to produce a constantly changing magnetic field. With the action of the magnetic elements 46, the magnetic field makes the rotor sleeve 41 rotate so as to drive the motor shaft 42 to rotate.

The stator bracket 45 is used to fix the stator core 43, which is fixedly connected with the stator core 43 as a whole. The motor shaft 42 is rotatably connected with the stator bracket 45. The stator bracket 45 is capable of supporting the rotatable motor shaft 42 through a bearing 47.

Relative to general inner rotor motors, the motor shaft 42 driven by the rotor sleeve 41 can output a large torque even the rotation speed is low, because the magnetic elements 46 are far away from the rotation axis of the rotor sleeve 41.

When the circular saw 100 is unloaded, a ratio between the rotation speed (RPM) of the motor shaft 42 and the rotation radius (mm) of the cutting element 20 is set in a range that is greater than or equal to 100 RPM/mm and less than or equal to 250 RPM/mm. The rotation speed (RPM) of the motor shaft 42 is the number of revolutions per minute of the motor shaft 42. This setting can balance the rotation speed and the output torque so as to obtain high cutting efficiency. Specifically, a ratio between the two rotation speeds of the motor shaft 42 and the cutting element 20 is set in a range that is greater than or equal to 2 and less than or equal to 3.

Further, when the circular saw 100 is unloaded, the ratio between the rotation speed (RPM) of the cutting element 20 and the rotation radius (mm) of the cutting element 20 is set in a range that is greater than or equal to 45 RPM/mm and less than or equal to 90 RPM/mm. The rotation speed (RPM) of the cutting element 20 is the number of revolutions per minute of the cutting element 20. The maximum output torque of the motor shaft 42 is set in a range that is greater than or equal to 0.2 Nm and less than or equal to 0.6 Nm. The maximum output torque of the cutting element 20 is set in a range that is greater than or equal to 0.6 Nm and less than or equal to 1.2 Nm.

In order to explain the influence of the structure and parameters on the cutting efficiency, four circular saws with different parameters are as shown in Table 1 are used to cut the same pine board and composite board along a straight line. The cutting speed and the cutting length supported by each unit of electricity of the four circular saws are detected.

The cutting length supported by each unit of electricity means the length of board cut by the circular saw while the circular saw consumes 1 AH of battery capacity.

The four circular saws including a first circular saw, a second circular saw, a third circular saw, and a fourth circular saw use the same size saw blade.

The first circular saw uses an inner rotor, brushless motor. The rotation speed of the inner rotor, brushless motor is 19500 rpm. A ratio between the two rotation speeds of the motor shaft and cutting element is 4.25, which is equal to the transmission ratio of the transmission system therebetween.

The second circular saw uses the same motor and saw blade as the first circular saw. The difference is the rotation speed of the inner rotor, brushless motor of the second circular saw is 2000 rpm. The ratio between the two rotation speeds of the motor shaft and cutting element of the second circular saw is 5.2.

The third circular saw uses the outer rotor, brushless motor as previously mentioned. The rotation speed of the outer rotor, brushless motor is 12800 rpm. The ratio between the two rotation speeds of the motor shaft and cutting element is 2.5.

The fourth circular saw uses the same motor as the third circular saw. The difference is a no-load speed of the outer rotor, brushless motor of the fourth circular saw is 12000 rpm. The ratio between the two rotation speeds of the motor shaft and cutting element is 2.2.

Table 2 shows the cutting speeds of different circular saws. From Table 2, regardless of cutting the pine board or the composite board, the third and fourth circular saws using the outer rotor, brushless motor have a higher cutting speed even when the rotation speed of the motor is low. Further, the cutting speed can be increased through adjusting the rotation speed of the motor and the transmission ratio.

Table 3 shows the cutting length per unit of electricity. From Table 3, regardless of cutting the pine board or the composite board, the cutting length of the third and fourth circular saws is longer than that of the first and second circular saws while the consuming 1 AH of battery capacity.

So, as illustrated above, the cutting speed and cutting ability of the circular saw are improved when using the outer rotor, brushless motor and the corresponding rotation speed and transmission ratio.

TABLE 1

|  | First circular saw | Second circular saw | Third circular saw | Fourth circular saw |
|---|---|---|---|---|
| Unloaded rotation speed (RPM) | 19500 | 20000 | 12800 | 12000 |
| Transmission ratio | 4.25 | 5.2 | 2.5 | 2.2 |

TABLE 2

|  |  | First circular saw | Second circular saw | Third circular saw | Fourth circular saw |
|---|---|---|---|---|---|
| Cutting speed (mm/s) | Pine board | 32.52 | 27.55 | 37.52 | 44.54 |
|  | Composite board | 49.31 | 67.78 | 68.04 | 80.8 |

TABLE 3

|  |  | First circular saw | Second circular saw | Third circular saw | Fourth circular saw |
|---|---|---|---|---|---|
| Cutting length (m) per unit of electricity (AH) | Pine board | 3.49 | 3.37 | 4.94 | 4.32 |
|  | Composite board | 6.09 | 7.65 | 8.74 | 8.99 |

The above illustrates and describes basic principles, main features and advantages of the present invention. Those skilled in the art should appreciate that the above embodiments do not limit the invention hereinafter claimed in any form. Technical solutions obtained by equivalent substitution or equivalent variations all fall within the scope of the invention hereinafter claimed.

What is claimed is:

1. A cutting machine, comprising:
a cutting element for cutting a material;
a motor for driving the cutting element to rotate; and
a housing for containing the motor,
wherein the motor comprises:
 a rotor sleeve formed with a receiving chamber;
 a motor shaft capable of rotating together with the rotor sleeve;
 a stator core at least partially contained in the receiving chamber;
 stator coils wound around the stator core; and
 a stator bracket for fixing the stator core, and
wherein the stator core is formed with a through hole for the motor shaft to pass there through, the stator coils are located outside the through hole, and the motor shaft is capable of rotating relative to the stator core.

2. The cutting machine of claim 1, wherein when the cutting machine is unloaded, a ratio between number of turns per minute of the motor shaft and a rotation radius of the cutting element is in a range that greater than or equal to 100 $mm^{-1}$ and less than or equal to 250 $mm^{-1}$.

3. The cutting machine of claim 2, wherein a ratio between two rotation speeds of the motor shaft and the cutting element is in a range that greater than or equal to 2 and less than or equal to 3.

4. The cutting machine of claim 1, wherein when the cutting machine is unloaded, a ratio between number of turns per minute of the cutting element and a rotation radius of the cutting element is in a range that greater than or equal to 45 $mm^{-1}$ and less than or equal to 90 $mm^{-1}$.

5. The cutting machine of claim 1, wherein a maximum output torque of the cutting element is in a range that is greater than 0.6 Nm and less than or equal to 1.2 Nm.

6. A circular saw, comprising:
a saw blade for cutting a material;
a motor for driving the saw blade to rotate; and
a housing for containing the motor,
wherein the motor comprises:
 a rotor sleeve formed with a receiving chamber;
 a motor shaft capable of rotating together with the rotor sleeve;
 a stator core at least partially contained in the receiving chamber;
 stator coils wound around the stator core; and
 a stator bracket for fixing the stator core, and
wherein the stator core is formed with a through hole for the motor shaft to pass there through, the stator coils are located outside the through hole, and the motor shaft is capable of rotating relative to the stator core.

7. The circular saw of claim 6, wherein when the circular saw is unloaded, a ratio between number of turns per minute of the motor shaft and a rotation radius of the saw blade is in a range that greater than or equal to 100 $mm^{-1}$ and less than or equal to 250 $mm^{-1}$.

8. The circular saw of claim 7, wherein a ratio between two rotation speeds of the motor shaft and the saw blade is in a range that greater than or equal to 2 and less than or equal to 3.

9. The circular saw of claim 6, wherein when the circular saw is unloaded, a ratio between number of turns per minute of the motor shaft and a rotation radius of the saw blade is in a range that greater than or equal to 45 $mm^{-1}$ and less than or equal to 90 $mm^{-1}$.

10. The circular saw of claim 6, wherein a maximum output torque of the circular saw is in a range that is greater than 0.6 Nm and less than or equal to 1.2 Nm.

* * * * *